(12) United States Patent
Qi et al.

(10) Patent No.: US 12,711,524 B2
(45) Date of Patent: Aug. 18, 2026

(54) CLICK-THROUGH RATE MODEL AND GENERATING CUSTOMIZED COPIES USING MACHINE-LEARNED LARGE LANGUAGE MODELS

(71) Applicant: Maplebear Inc., San Francisco, CA (US)

(72) Inventors: Peng Qi, Menlo Park, CA (US); Vikaram Gupta, Menlo Park, CA (US)

(73) Assignee: Maplebear Inc., San Francisco, CA (US)

(*) Notice: Subject to any disclaimer, the term of this patent is extended or adjusted under 35 U.S.C. 154(b) by 0 days.

(21) Appl. No.: 18/666,493

(22) Filed: May 16, 2024

(65) Prior Publication Data

US 2024/0386462 A1 Nov. 21, 2024

Related U.S. Application Data

(60) Provisional application No. 63/513,537, filed on Jul. 13, 2023, provisional application No. 63/522,248, filed on Jun. 21, 2023, provisional application No. 63/467,105, filed on May 17, 2023.

(51) Int. Cl.
*G06Q 30/0251* (2023.01)
*G06Q 30/0201* (2023.01)
*G06Q 30/0241* (2023.01)

(52) U.S. Cl.
CPC ..... *G06Q 30/0255* (2013.01); *G06Q 30/0201* (2013.01); *G06Q 30/0276* (2013.01)

(58) Field of Classification Search
CPC ........... G06Q 30/0255; G06Q 30/0201; G06Q 30/0276
See application file for complete search history.

(56) References Cited

U.S. PATENT DOCUMENTS

2022/0215061 A1* 7/2022 Nigul .................... G06N 20/00
2023/0281448 A1* 9/2023 Ma ........................ G06N 3/084 706/21
2024/0257175 A1* 8/2024 Saha ................. G06Q 30/0631
2024/0265427 A1* 8/2024 Olteanu Roberts .......................... G06Q 30/0271

OTHER PUBLICATIONS

Neha Chaudhuri, Gaurav Gupta, Vallurupalli Vamsi, Indranil Bose, Predicting Customers' Purchase Behavior Using Deep Learning, Jun. 15, 2021, Decision Support Systems, 149, 113622 (Year: 2021).*

* cited by examiner

*Primary Examiner* — Errol Carvalho
(74) *Attorney, Agent, or Firm* — Fenwick & West LLP

(57) ABSTRACT

An online system receives an indication that a user is starting an order. The online system retrieves candidate contents for the user and provides prompts to a model serving system. The model serving system is configured to provide scores for the contents based on relevancy, a likelihood of user interaction, and a likelihood of the user purchasing an item associated with the content. The online system provides scores from the model serving system to a predicted click-through rate (pCTR) model. Based on the pCTR model scores, the online system ranks the candidate contents. The online system provides content for display to the user based on the ranked candidate contents.

12 Claims, 9 Drawing Sheets

CLICK-THROUGH RATE MODEL AND GENERATING CUSTOMIZED COPIES USING MACHINE-LEARNED LARGE LANGUAGE MODELS

CROSS-REFERENCE TO RELATED APPLICATIONS

This application claims the benefit of U.S. Provisional Patent Application No. 63/467,105, filed on May 17, 2023, U.S. Provisional Patent Application No. 63/522,248, filed on Jun. 21, 2023, and U.S. Provisional Patent Application No. 63/513,537, filed on Jul. 13, 2023, all of which are hereby incorporated by reference in their entirety.

BACKGROUND

An online system is an online platform that provides one or more online services. An example of an online service is allowing users to perform transactions associated with items. The items may represent physical entities stored in a physical location. A user can place an order for purchasing items, such as groceries, from participating retailers via the online system, with the shopping being done by a picker. After the picker finishes shopping, the order is delivered to the user's address.

Oftentimes, the online system provides pre-generated content items to users for items that they might want to order. The online system may benefit from a user interacting with the pre-generated content item and selecting items described by the content to add to their order. However, it is challenging for the online system to determine which pre-generated contents to display to a user. With a large database of pre-generated content items, online systems can select content items for presentation that a user is more likely to interact with. However, online systems also must balance the computational resources required to store and search through large numbers of pre-generated content items. Thus, online systems often struggle to provide content to users that is relevant or useful to those users while not being over-burdened by the computational resources required to provide that content.

SUMMARY

In accordance with one or more aspects of the disclosure, an online system selects content for display to a user using a model serving system to determine scores for the content. The online system receives an indication that a user is starting an order. The online system retrieves candidate pre-generated content for the user. The candidate pre-generated content may be associated with available items for the user to order. The online system provides prompts to a model serving system. The prompts include a request for the model serving system to return one or more scores for each content. The scores may reflect the user's predicted likelihood to purchase an item in the content, a relevancy of the content to the user, and a likelihood that the user will interact with the content. The online system provides scores from the model serving system to a predicted click-through rate (pCTR) model. The pCTR model returns a cumulative score for each content, after weighing each score that was provided and based on features related to the user and the items in the candidate contents. For example, for some users, the relevance score may be weighed higher than the interaction score, based on the user's previous interactions and purchases. The online system may rank the candidate pre-generated content according to the pCTR scores and bid prices and provides a content for display to the user.

DETAILED DESCRIPTION

Figure 1A:
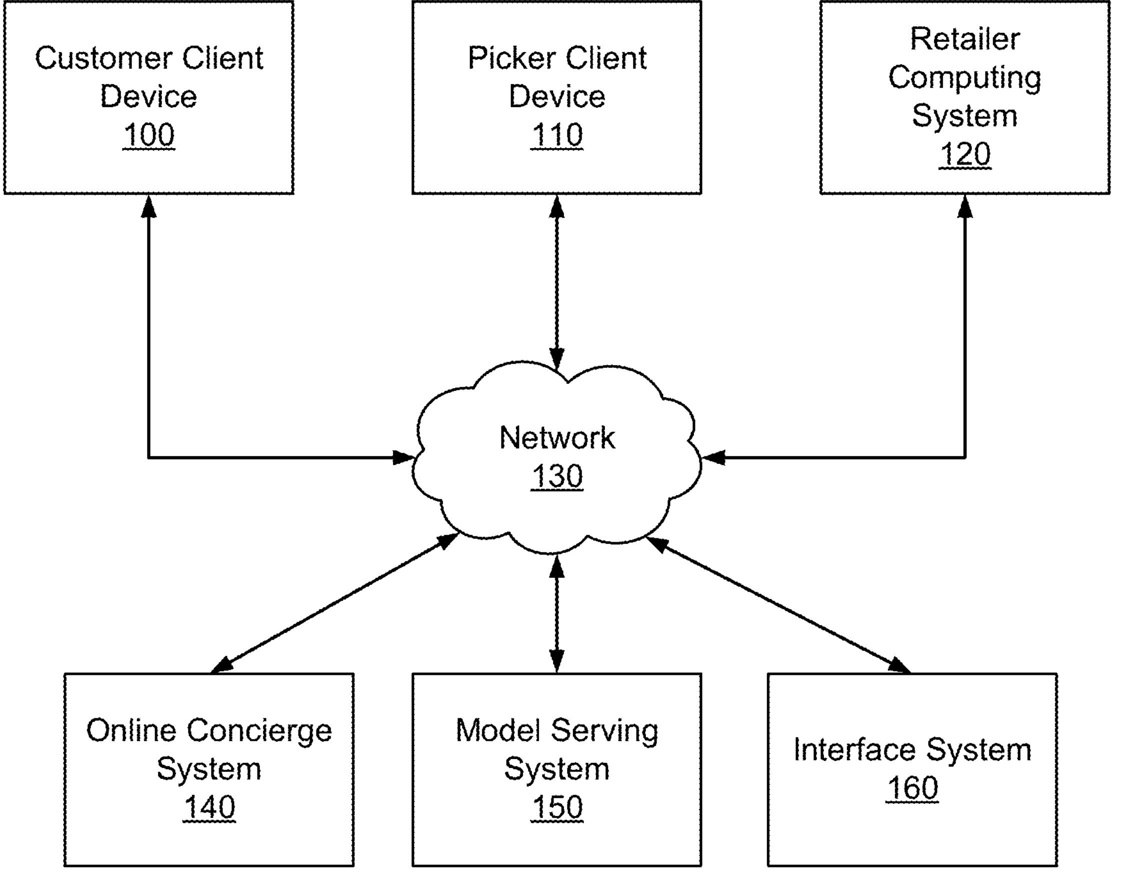
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Figure 1B:
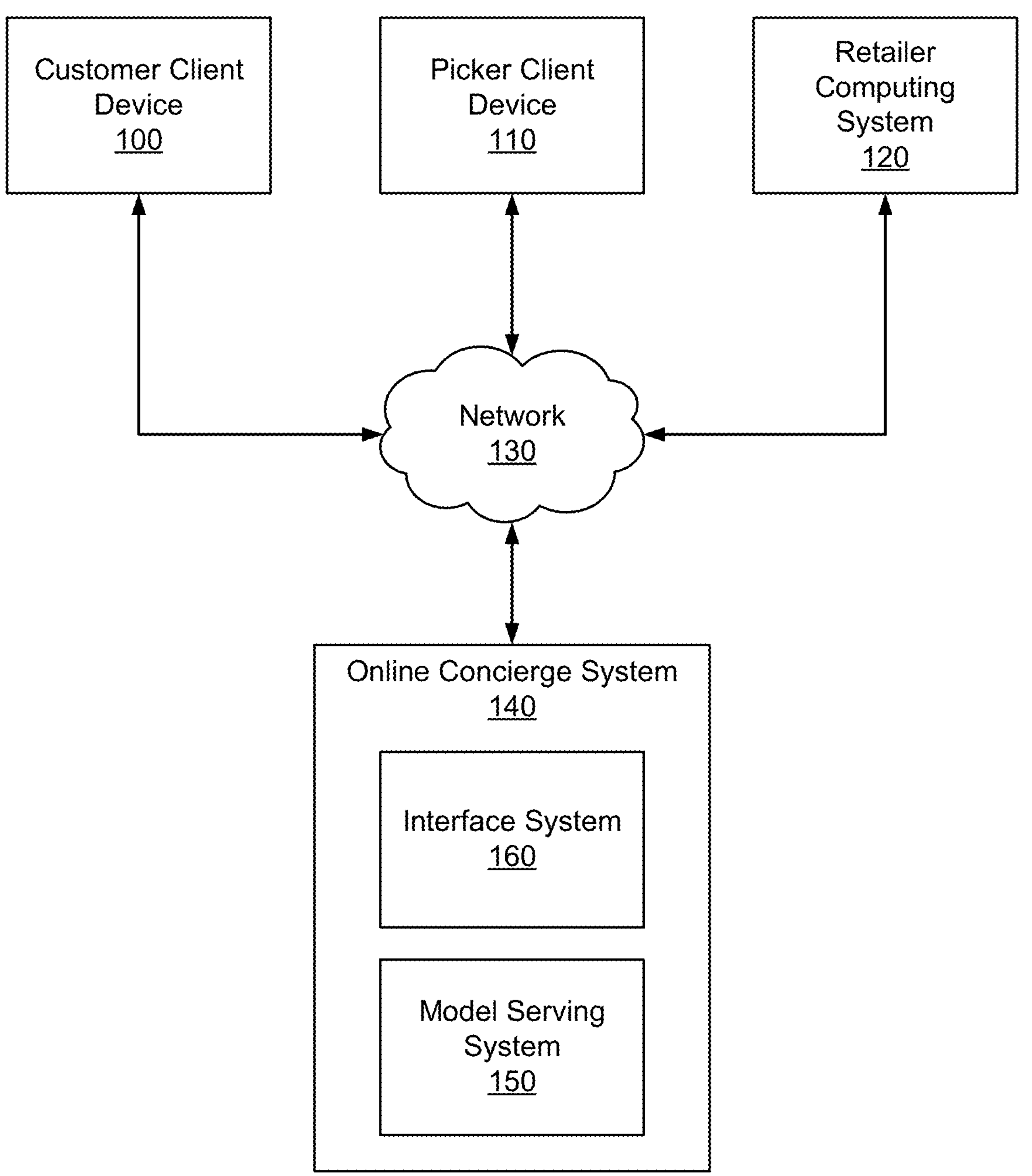
FIG. 1B illustrates an example system environment for an online system, in accordance with one or more embodiments.

As used herein, customers, pickers, and retailers may be generically referred to as "users" of the online system 140. Additionally, while one customer client device 100, picker client device 110, and retailer computing system 120 are illustrated in FIG. 1B, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, the online system 140 performs one or more inference tasks in conjunction with one or more machine-learned large language models (LLM's) to generate personalized content items and serve content items to users. In one or more embodiments, the online system 140 performs a query to determine the effectiveness of the set of candidate content for a user. The online system 140 generates an interaction likelihood a user will interact with the candidate content (or any other type of sponsored content item) by generating one or more prediction scores from a LLM or other machine-learned transformer-based architecture. Further, the online system 140 accesses a machine-learned interaction model (e.g., pCTR model) configured to receive a set of features of the candidate content, the user, and the generated prediction scores (from LLM) and generate an interaction likelihood indicating whether the user will interact with the item associated with the content.

In one or more embodiments, the online system 140 identifies a set of candidate content items to present to a user. A content item may be an advertisement, a recommendation to a user to purchase an item of a retailer, a banner, and the like. To determine the effectiveness of the candidate content, the online system 140 generates via an LLM, prediction scores based on a user's purchase or engagement history with the online system 140, for example, a user's search sequence on the online system 140, the items currently stored in the user's order, and/or the user's previous purchases (e.g., list of previous items purchased) from the online system 140.

In one instance, the prediction scores include a purchase score indicating a likelihood the user purchases an item associated with the content presented to the user, based on the user's purchase or engagement history. Specifically, the online system 140 prepares a prompt for input to the model serving system 150. The prompt may include a request for the model serving system 150 to return a likelihood that a user will purchase an item based on the items already in the user's order, user's search query, or the user's previous purchases. In some embodiments, the prompt may request a score between 1 to 10 for an item, with 10 representing a high likelihood that the user will purchase the item and 1 representing a low likelihood. In one instance, the prediction scores may also include a relevance score indicating how relevant an item in a candidate content item is to the user's purchase or engagement history. The prompt may include a request for the model serving system 150 to score the relevance of the item, for example, from 0 to 1, where 0 indicates a lowest relevance and 1 indicates a highest relevance.

In one or more instances, the prediction scores may also include a click-through score (CTR score) indicating a likelihood a user will click or interact with the candidate content based on the user's purchase or engagement history. The prompt may include a request for the model serving system 150 to determine a likelihood that the user will interact with the content for the item, for example, through a click, a conversion, or any other appropriate interaction. The online system 140 receives a response to the prompt from the model serving system 150 based on execution of the machine-learned model using the prompt.

The online system 140 may also extract a set of features for a candidate content in the set of candidate contents. The online system 140 provides the prediction scores and the set of features for the candidate content to the interaction model. The interaction model generates an interaction likelihood (e.g., pCTR likelihoods) that the user will interact with the candidate content, for example, click on or convert on the item in the candidate content. The online system may rank the candidate contents based on the interaction likelihoods and select a candidate content from the top ranked items for which to display content. In some embodiments, the candidate contents are ranked based on interaction likelihoods, bid prices and other factors. For example, the rankings may be based on a combination (multiplication) of the interaction likelihood and bid price for a candidate pre-generated content. In some embodiments, online system 140 may use the response from the model serving system 150 as an input for another model, such as clickthrough rate model or a relevance model. The online system 140 selects content that corresponds to the highest scoring items to display.

In one or more embodiments, the different types of prediction scores (e.g., purchase score, relevance score, click-through score) can be weighted differently when input to the interaction model, and/or the interaction model when trained can learn in which cases a prediction score of a specific type (e.g., purchase score) should be weighted heavier than a prediction score of a different type (e.g., relevance score). For example, the relevance score can be a better predictor of the interaction likelihood for candidate pre-generated content if the users like to click on relevant items, while for a different set of users, the purchase score is a better predictor if the users click on content describing items that the users will purchase but not click on highly relevant items that they will not purchase anyway.

In this manner, using a LLM to improve the interaction model can have a significant impact on the customer experience. By providing more relevant and personalized results, users will be able to find the products they are looking for more quickly and easily. This can lead to increase in user satisfaction and retention, as well as increased sales for the online system 140. Additionally, the use of LLM can also improve the performance of search contents on the platform, leading to increased content revenue.

In one or more embodiments, the online system 140 performs a query to generate a set of personalized candidate content items to present to a user. Specifically, the online system 140 provides information including the user's profile, interaction history, purchase history, and an item of the user's cart. The online system 140 provides a query to the interface system 160. The online system 140 receives a response to the prompt from the interface system 160 based on execution of the machine-learned model in the model serving system 150 using prompts generated by the interface system 160. In some embodiments, the prompt provides a set of content parameters (e.g., dimensions of the content, text provided by the CPG to describe the item), user information, and relevant item data.

In one or more embodiments, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140.

Figure 2:
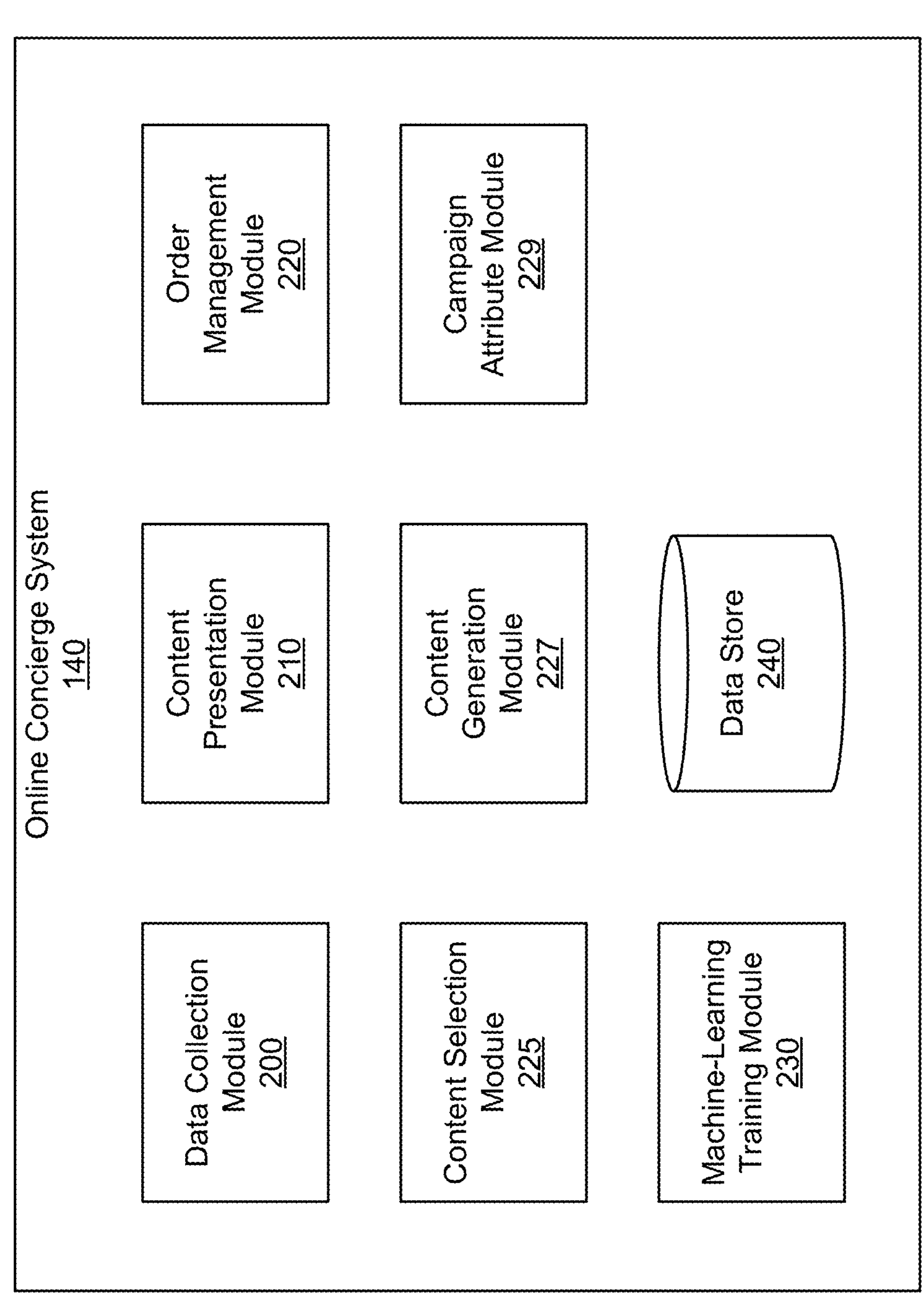
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

Generating Prediction Scores Using LLM and Serving Content Items Based on Prediction Scores The content selection module 225 identifies a set of candidate contents for presentation to a user's session on the online system 140. The content selection module 225 determines interaction likelihoods for the set of candidate contents that indicate a likelihood a user will interact with the candidate content. As described in conjunction with FIG. 1A, in one or more embodiments, the content selection module 225 incorporates one or more prediction scores generated by a LLM or other appropriate model, such as a transformer-based architecture when determining the interaction likelihoods.

Compared to traditional systems, the content selection module 225 provides a wholistic and dynamic view of the user, increasing the accuracy of the calculated interaction likelihoods of the content presented to the user. An LLM is trained to analyze interactions of the user and the online system, by receiving user data and item data describing the user. Thus, the LLM offers contextual analysis of an interaction between the user and the set of received personalized content when estimating an interaction likelihood between the user and the model. The content selection module 225 perspective that is not structurally available in traditional models.

In one or more embodiments, the content selection module 225 provides the model serving system 150 with a description of the set of candidate content items and a prompt. The prompt may include a list of items in the user's order and a list of available items. In this case, the prompt would request a score between 1 and 10 indicating how likely the user is to purchase each of the available items based on the user's order. The content selection module 225 may provide a prompt such as "[a] user is shopping and has [list of user's items] in their basket, provide a score between 1 and 10 (i.e., 1 indicating lowest likelihood, 10 indicating highest likelihood) indicating how likely a user is to purchase one of the following items: pink lady apples, soda, cherries." The model serving system 150 returns a score for each item indicating a likelihood that the user will purchase each candidate item. For example, the model serving system may return "pink lady apples: 4, soda: 8, cherries: 6." In another embodiment, the content selection module 225 provides the model serving system 150 with a user's previous purchases. The prompt may include a request to return a score for each item in a list of available items based on the user's likelihood to purchase each item.

In some embodiments, the content selection module 225 may request the score to reflect the user's likelihood to click on a content item associated with the items.

In one or more embodiments, the content selection module 225 may request the score to reflect the item's relevance to the user or to the items in the user's order. For example, the interface system 160 may provide the prompt "A user has steak in his basket, provide a score between 1 and 10 (i.e., 1 indicating lowest likelihood, 10 indicating highest likelihood) indicating how likely a user is to purchase each of the following items: margarita mix, cabernet, orange juice." The model serving system 150 may return the scores in a python list, such as [3, 6, 4].

The content selection module 225 also trains an interaction model configured as a machine-learned model with a set of parameters. The content selection module 225 trains the interaction model using a training dataset. The training dataset includes one or more training instances. A training instance for a user and content includes features related to the content that was displayed to the user and features related to the user, as well as the user's known interaction with the content. The training instance also includes one or more prediction scores generated by the LLM of the model serving system 150, including a relevance score for the item associated with the content, and a purchase score, and or interaction score as described above. The interaction model may be trained on this data to predict whether a user will click on the content item based on their order history or other items in their order. The interaction model may predict whether a user will purchase an item in the content, based on the user's past interactions with content items.

Figure 3:
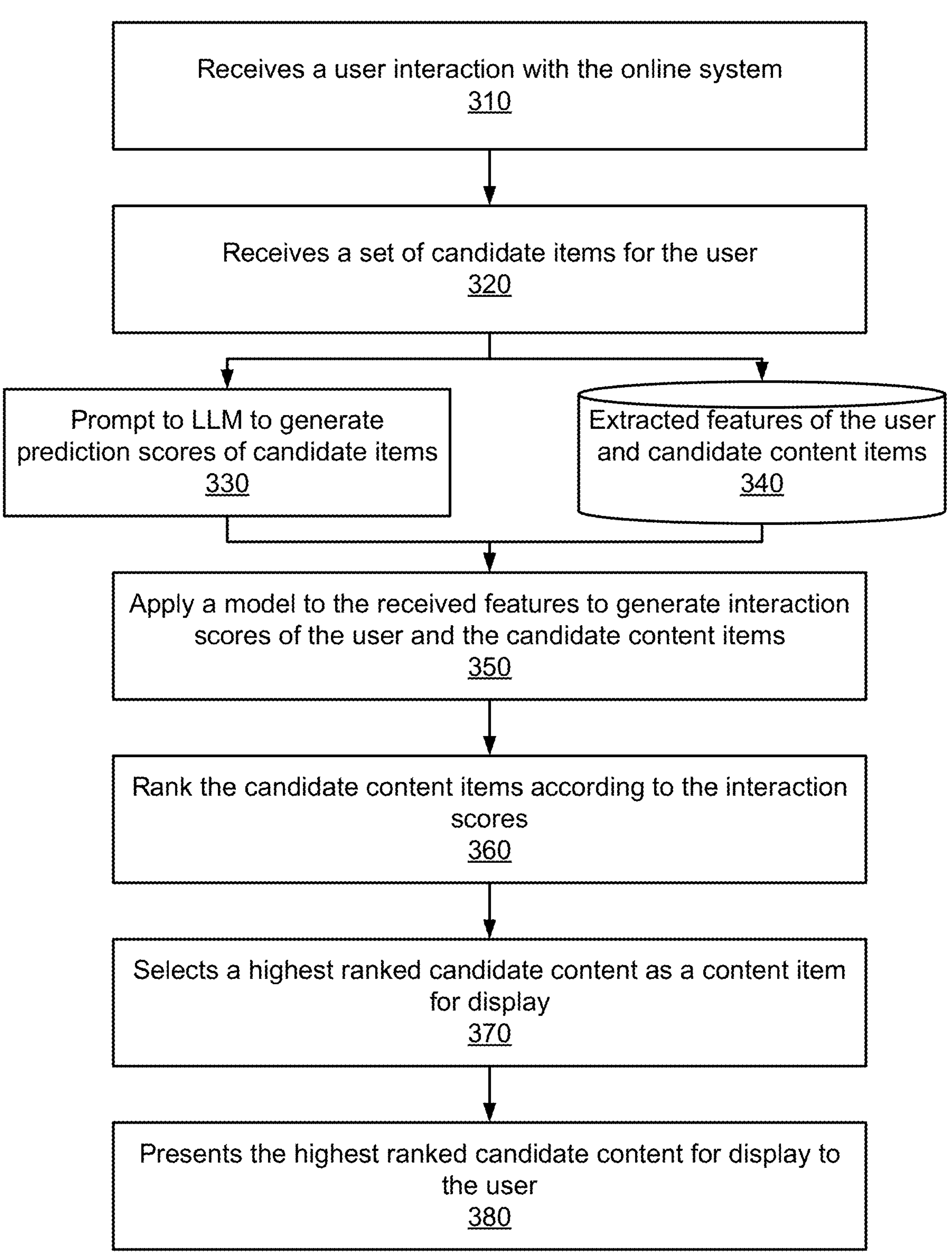
FIG. 3 is a flowchart for providing content to a user, in accordance with one or more embodiments.

FIG. 3 is a flowchart for a method of providing content to a user, in accordance with one or more embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140 of content selection module 225). Additionally, each of these steps may be performed automatically by the online concierge system without human intervention.

As illustrated in FIG. 3, the content selection module 225 receives 310 an indication that a user is starting an order. The user may begin a search or begin adding items to their basket to start an order to signal the start of an order. The content selection module 225 retrieves 320 candidate content items for the user and a set of candidate items that are promoted or otherwise described by the candidate content items. The content selection module 225 prompts 330 the LLM to generate prediction scores of the set of candidate items. In one or more embodiments, the prompts comprise a request for one or more prediction scores for each candidate content, and may receive the one or more prediction scores accordingly. The model serving system 150 may return a relevance score, a purchase likelihood, and an interaction likelihood for the user. The content selection module 225 extracts features of the user and the candidate content items. Further, the content selection module 225 applies 350 a model to the received features to generate interaction scores of the user and the candidate content items. The content selection module 225 ranks 360 the candidate content according to the interaction scores, bid prices, and other factors and selects 370 the highest ranked candidate content item (or content items having interaction scores or bid prices above a threshold). The content selection module 225 presents 380 the selected candidate content item for display to the user. In one or more embodiments, the content selection module 225 receives feedback from the user of the selected candidate content item. The feedback data can be used to construct a training dataset that can be used to fine-tune the parameters of the machine-learned generation model.

Generating Customized Copies for Content Items Using LLM

Returning to FIG. 2, the content generation module 227 generates personalized content for a user of the online system 140 in conjunction with an LLM. The content generation module 227 selects a user of the online system 140 to receive personalized content describing an item available on the online system 140. The content generation module 227 accesses user data for this "receiving user" and generates the prompt based on the user data. The user data describes characteristics of the receiving user, and may include information such as other items with which the user has interacted (e.g., ordered), the user's address, ordering preferences, or favorite items. In some embodiments, the user data also describes an item list indicating a tentative set of items that the user has selected for an order but that has not yet been finalized for an order.

The content generation module 227 also generates the prompt based on item data describing the item that the content generation module 227 accesses from an item database. The item data describes characteristics of the item, such as a category, description, size, color, weight, stock keeping unit (SKU), or serial number for the item. In some embodiments, the item data also describes the receiving user's previous interactions with the items.

The content generation module 227 may generate the prompt by populating a prompt template. The prompt template may have generic text that prompts the model serving system 150 to generate a personalized content item for the receiving user and fields that can be filled with data to be used by the model serving system 150 in generating the response. For example, the content generation module 227 may populate a prompt template, such as "What is a text description encouraging a user who usually buys <ITEM A> to interact with <ITEM B>?" or "Please generate an image of <ITEM C>that would encourage a user from <LOCATION D> to interact with the item." The content generation module 227 populates the fields in the prompt templates with the corresponding information from the item data or the user data.

In some embodiments, the prompt includes additional contextual information for generating the requested content. For example, the prompt may specify a type of content to be generated, a size of the content to be generated, an intended goal for the content, a context within which the content will be presented, or whether the content is sponsored. Where the content generation module 227 uses a prompt template, this additional information may be preset information in the prompt template or may be fields that are populated by the content generation module 227.

The content generation module 227 transmits the prompt to the model serving system 150 and receives a response from the model serving system. The content generation module 227 uses the response to generate a content item to present to the receiving user. For example, if the response includes text content to present to the user, the content generation module 227 may generate a content item that displays the text content with an image of the item stored in an item database by the online system 140. In some embodiments, the content generation module 227 populates a content template with the content that is included in the response from the model serving system 150.

As an example, the content generation module 227 may generate a personalized content item for a user's previous ordering including an item of brand 'B1 2% milk'. In one instance, the content generation module 227 may prompt the model serving system 150 to convert a user from purchasing the item of brand 'B1 2% milk' to purchase 'A2 2% milk'. The content generation module 227 prompts the model serving system 150 to "For 'A2 2% milk', what can be the ad copy in the morning for a user who usually buys 'B1 2% milk'?" The system then would generate different ad copy prompts for different times of the day based on favorite items (e.g., Item B) associated with different users in the database. The content generation module 227 receives a response from the model serving system 150: <Version 1>: "Start your day right with A2 2% milk! A creamy alternative to B1, easy on digestion and smooth in taste. Order now." <Version 2>: "Start your day right with A2 2% milk! A creamy alternative to B1 milk, easy on digestion and smooth in taste. Try it now." The content generation module 227 populates the content template with the response from the model serving system 150.

The content generation module 227 generates candidate content items incorporating the customized copy messages. The content generation module 227 transmits the generated personalized content item to a client device associated with the receiving user. In some embodiments, where the item is associated with a manufacturer or sponsor, the content generation module 227 may transmit the personalized content item to the manufacturer or sponsor for preapproval before transmitting the personalized content item to the receiving user. The content generation module 227 also may generate multiple personalized content items and may use A/B testing to select which personalized content item to transmit to the receiving user's client device.

In one or more embodiments, the content generation module 227 identifies positive instances of feedback in which positive feedback was positively received for the transmitted personalized content. In other embodiments, the content generation module 227 may identify negative instances of feedback where a person provided negative feedback to the selected content. The content generation module 227 may monitor the responses received from the user of the online system, the response of verification from a human, or a CPG of the content. The content generation module 227 classifies the responses as receiving positive feedback if a human-in-the-loop (e.g., receiving party) confirmed (e.g., presented, upvoted, submitted, clicked) the received content, or classify the responses as receiving negative feedback if the human-in-the-loop (e.g., receiving party) declined (e.g., downvoted, did not present, rejected) the content. The content generation module 227 may fine-tune parameters of the LLM based on the positive instances of feedback or negative instances of feedback.

Figure 4:
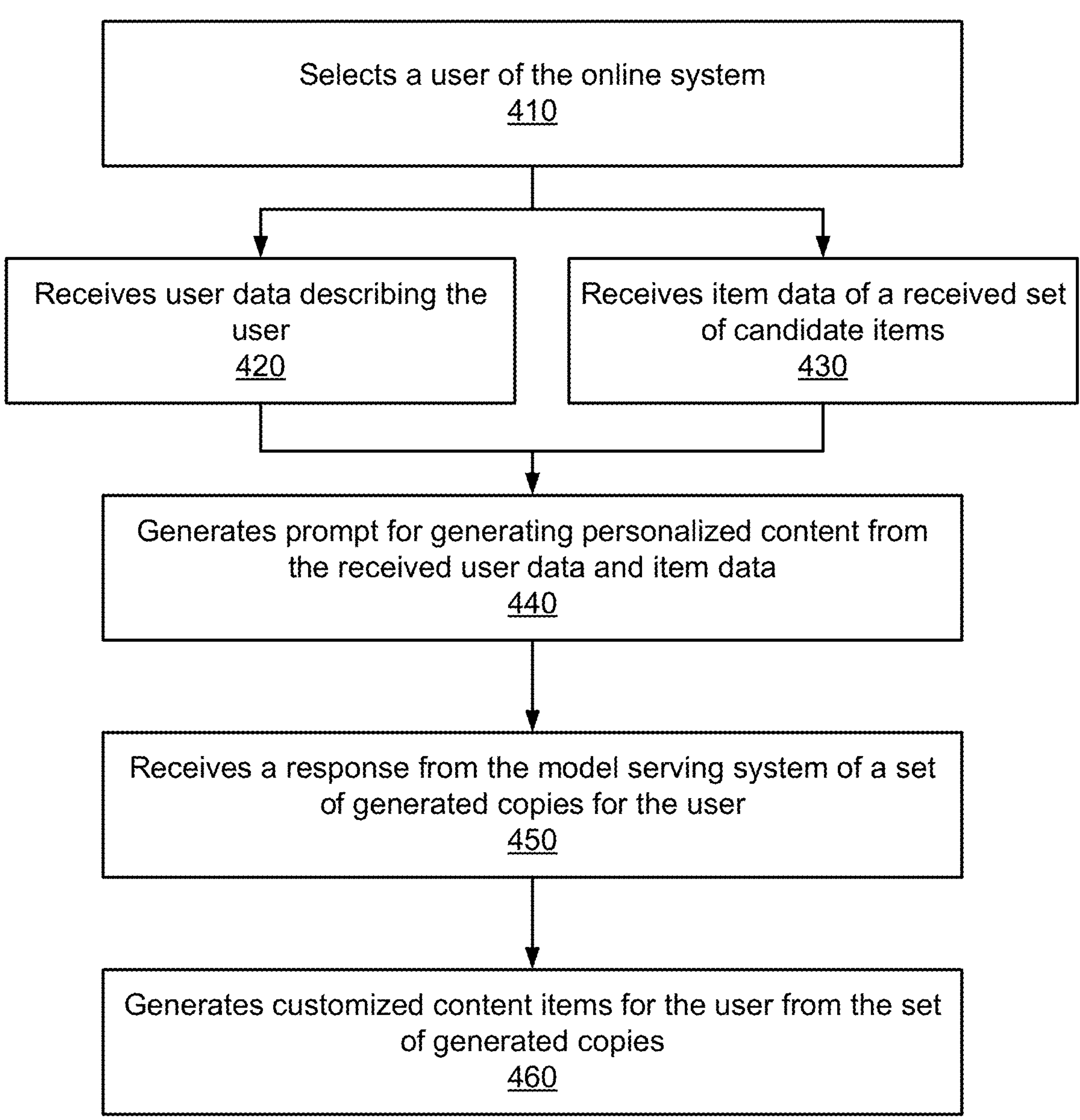
FIG. 4 is a flowchart for generating copies for content for a user, in accordance with one or more embodiments.

FIG. 4 is a flowchart for generating copies for content for a user, in accordance with one or more embodiments. The content generation module 227 selects 410 a user of the online system 140. The content generation module receives 420 user data describing the user (e.g., user demographics, past order history, browsing history, etc.). The module receives 430 item data for a set of candidate items. The candidate items may be identified based on items in the user's cart or substitutes of items in the cart. The content generation module 227 generates 440 a prompt the LLM to generate customized copies for the user based on the user data and the item data for each candidate item. Specifically, each candidate item may already have a candidate content item (e.g., ad image) associated with the item and the customized copies are to be incorporated with the candidate content item. The content generation module 227 receives 450 a response from the model serving system 150 with a generated content copy. The content generation module 227 generates 460 customized content items for the user from the set of personalized content templates. For example, the content generation module 227 may generate a customized copy for 'B1 2% milk' as described above and incorporates the copy to an ad image of 'B1 2% milk.' In one or more embodiments, the content generation module 227 obtains the set of generated customized content items and performs an auction process to select one or more content items to present to the user. The content generation module 227 presents the customized content items to the user for display on the client device. In one or more embodiments, the content generation module 227 receives feedback from the user of the customized content item. The feedback data can be used to construct training data to fine-tune parameters of the machine-learned generation model.

Using LLM Generated Scores to Present Content Items with Customized Copies

In one or more embodiments, the online system 140 performs a joint process in coordination with the content generation module 227 and content selection module 225 to generate customized content items for a user, generate prediction scores for the candidate content items, and select content items for display.

In one or more embodiments, the content selection module 225 may receive one or more content item variations generated by the content generation module 227 that have customized copies for the content items and generate prediction scores for the variations to select and present a content item to a user.

In one or more embodiments, the content selection module 225 receives the generated personalized content items from the content generation module 227. Responsive to receiving a request to present a content item for display to a user (e.g., after a user has logged in to an application or opened a page of the online system 140), the content generation module 227 generates variations of content for multiple items (e.g., cookies, cheese curls, sour candy) for the user. The content selection module 225 receives the variations and generates the scores for input to the interaction model (e.g., pCTR model).

Figure 5:
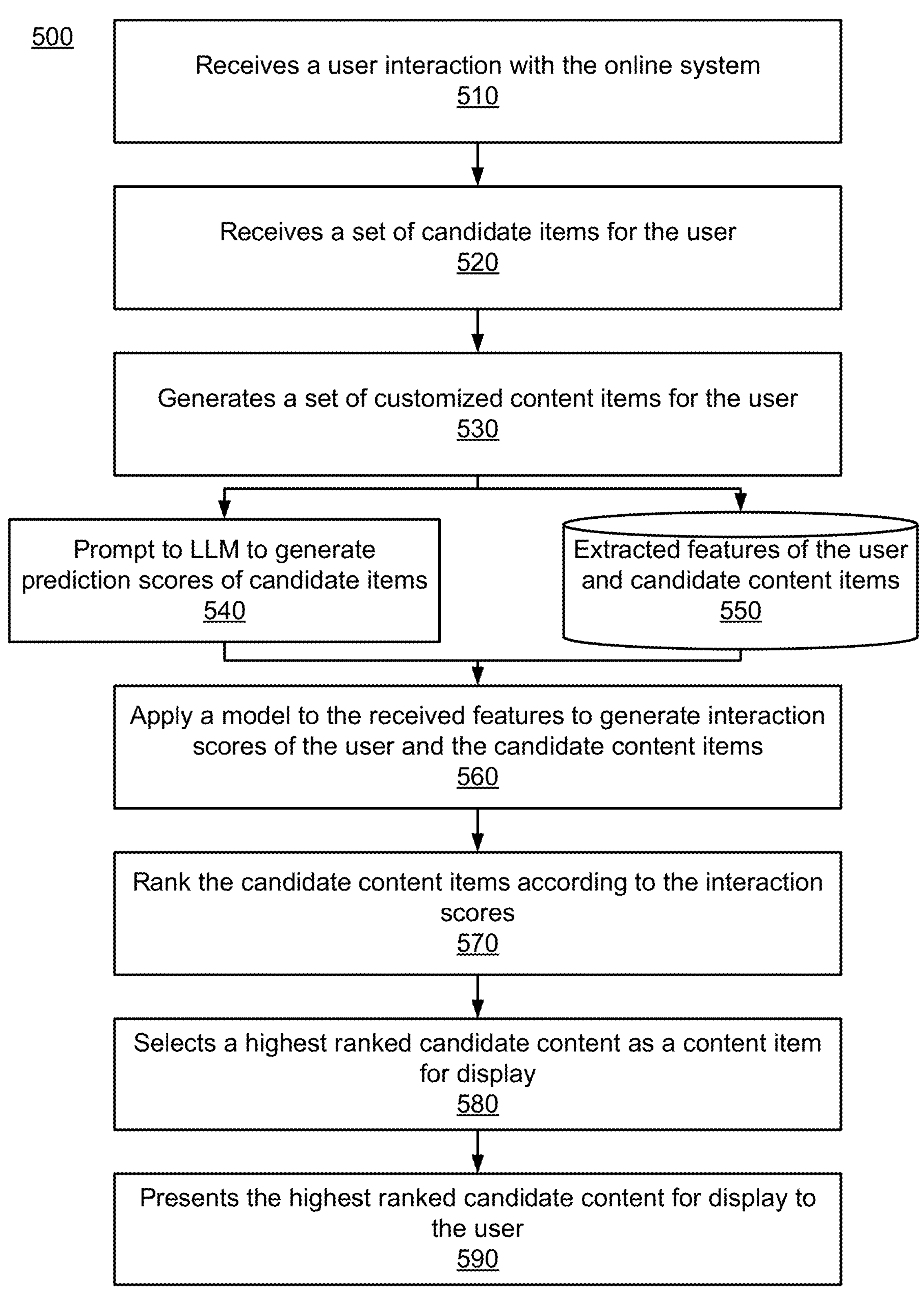
FIG. 5 is a flowchart for providing content to a user, in accordance with one or more embodiments.

FIG. 5 is a flowchart for providing content to a user, in accordance with one or more embodiments. The content selection module 225 receives 510 a user interaction with the online system 140, and receives 520 a set of candidate items for the user. The content generation module 227 generates a set of customized candidate content items for the user. The content generation module 227 generates 530 a set of personalized content items for the user according to the user's interaction with the online system 140. In particular, the process of generating customized content items for a set of candidate items may be substantially similar to the process described in conjunction with FIG. 4.

Similar to the process described in conjunction with FIG. 3, the content selection module 225 also prompts 540 a LLM to generate a prediction score of the received candidate content items. The content selection module 225 receives a response of the prediction scores from the LLM for the set of generated customized content items. The content selection module 225 obtains extracted features of the user and the candidate content items 550. The content selection module 225 applies 560 a machine-learned interaction model to the received features and prediction scores to generate interaction scores for the candidate content items. The content selection module 225 ranks 570 the candidate content items according to the interaction scores from the interaction model. The content selection module 225 selects 580 the highest ranked candidate content for display to the user. The content selection module 225 presents 590 the selected content item for display to the user.

In one or more embodiments, the online system 140 may perform A/B testing (experiments), where a first experiment presents content items to a first group of users without customizing the copies of the content items. The content items may be selected by obtaining the LLM-generated scores and inputting them into the interaction model (e.g., pCTR model), selecting content item with highest likelihood. A second experiment presents content items to a second group of users that have customized copies for each user. The content items may be selected by obtaining the LLM-generated scores and inputting them into the pCTR model. The online system 140 obtains outcomes for each experiment (e.g., degree of conversion, clicks), such that the performance of each experiment can be evaluated.

In one or more embodiments, the content selection module 225 identifies positive instances of feedback in which positive feedback was positively received for the selected content generated based on the LLM. In other embodiments, the content selection module 225 may identify negative instances of feedback where a person provided negative feedback to the selected content. The content selection module 225 may monitor the responses received from the user of the online system, the response of verification from a human, or a CPG of the content. The content selection module 225 classifies the responses as receiving positive feedback if a human-in-the-loop (e.g., receiving party) confirmed (e.g., presented, upvoted, submitted, clicked) the received content, or classify the responses as receiving negative feedback if the human-in-the-loop (e.g., receiving party) declined (e.g., downvoted, did not present, rejected) the content. The content selection module 225 may fine-tune parameters of the LLM based on the positive instances of feedback or negative instances of feedback.

Suggesting Attribute Values for Ad Campaigns Using LLM's

Returning to FIG. 2, in one or more embodiments, a campaign setting module 229 coordinates content item campaigns to promote or sponsor an item listed on the online system 140. The campaign setting module 229 may configure attribute values for the ad campaign that may include one or more settings for budget, target audience, bid price, campaign start date, campaign end date, and the like. The user may have to configure the campaign attributes manually. Such configuration, however, might not be based on real world knowledge, which may result in less effective campaigns.

Therefore, in one or more embodiments, the campaign setting module 229 performs operations to suggest attribute values (e.g., values for attributes like start/stop dates, targeting criteria, budget, etc.) of an ad campaign (or any other campaign for other types of content items) and pre-populate the suggested attribute values in a user interface (UI) enabling the user (e.g., advertiser, retailer) to automate aspects of the ad campaign (e.g., automatically control campaign schedule, automatically target user groups or areas for the campaign, etc.).

Specifically, in response to a user (e.g., advertiser) interacting with an interface to create an ad campaign, the online system 140 may prepare a prompt for input to the model serving system 150. The prompt may be prepared based on the user specifying (e.g., selecting) a particular product being sponsored under the ad campaign. The prompt may include information regarding the product being sponsored, product description, and information regarding one or more attributes of the ad campaign for which attribute values are to be recommended by the machine-learned model. The prompt may also include historical information related to past performance of the ad campaign for the same product or similar products in the same product category, or historical information of past attribute values set for the different attributes in past ad campaigns for the same product or similar products.

The campaign setting module 229 receives a response from the model serving system 150 based on execution of the machine-learned model using the prompt. The response may include suggested attribute values for attributes included in the prompt and may additionally include information regarding why each attribute value for each attribute is suggested by the machine-learned model. The online system 140 obtains the response and may automate the ad campaign creation process by pre-populating or otherwise suggesting values for one or more attributes of the UI form fields for the ad campaign. The online system 140 may further include mechanisms (e.g., more information icon, mouse hover popup text, etc.) to present the reasoning behind suggesting particular attribute values (or auto-filled values for one or more attributes in the UI form fields) for the ad campaign to the user. The online system 140 can automate the ad campaign creation process for the advertiser and make it easier and faster for the advertiser to launch high performing ad campaigns on the online system 140.

The campaign setting module 229 is configured to perform the task of configuring ad campaign settings in conjunction with an LLM. In one or more embodiments, in response to an item being specified by the user for sponsoring under an ad campaign, the campaign setting module 229 may pre-populate (e.g., autofill) one or more form fields of a user interface for configuring settings of the ad campaign with attribute values based on output recommendations from the machine-learned model. In another embodiment, instead of auto filling the form fields, the campaign setting module 229 may provide one or more suggestions for one or more attributes of the ad campaign based on the output recommendations from the machine-learned model. The campaign setting module 229 may also be configured to present the user with the reasons for the auto filled values or suggestions based on the output from the machine-learned model.

In some embodiments, the campaign setting module 229 may also utilize the historical information related to past ad campaigns to obtain more fine-tuned output recommendations from the machine-learned model.

In some embodiments, the campaign setting module 229 may extract information for the input prompt to the machine-learned model in response to a new ad campaign for a particular product being created by the user. For example, when the user interacts with a user interface to create a new ad campaign and specify a product being sponsored under the ad campaign, the campaign setting module 229 may obtain information regarding the product and corresponding item description from the item data collected by the data collection module 200 and stored in the data store 240. The campaign setting module 229 may further obtain information regarding the attributes corresponding to the form fields of the ad campaign from the data store 240 to generate one or more prompts for input to the machine-learned models. In one or more embodiments, the campaign setting module 229 may also obtain the historical ad campaign information from the data store 240 based on the product being sponsored. For example, the campaign setting module 229 may utilize a product similarity model to identify one or more products that are similar to the product being sponsored (e.g., similar products in the same product category) and obtain the historical ad campaign information from the data store 240 for the identified one or more similar products.

The campaign setting module 229 may utilize the extracted information (e.g., item name, item description, historical information, one or more ad campaign attributes, etc.) to generate one or more input prompts to the machine-learned model. For example, the campaign setting module 229 may generate an input prompt for each attribute for which the recommendation is sought from the machine-learned model. The campaign setting module 229 may utilize predefined prompt templates to generate the input prompts based on the extracted information.

For example, a user may start interacting with a user interface to create an ad campaign and specify "Chipitos" as the product which is being sponsored under the ad campaign. Based on this selection, the campaign setting module 229 may extract information and generate an input prompt. An example input prompt to the LLM of the model serving system 150 may be:

"Could you propose the exact starting and ending dates for ad campaigns for Chipitos on ABC Co.?"

A response from the LLM to the above input prompt may be:

"As an AI language model, I don't have access to the specific marketing plans or goals of Chipitos or ABC Co. However, I can provide some general information and recommendations based on market trends and events that are relevant to Chipitos. Chipitos is a popular snack that can be consumed throughout the year, so advertising on ABC Co. year-round may be appropriate. However, Chipitos may want to consider launching special promotions and campaigns during particular times of the year when there may be higher demand for their products. Here are some potential starting and ending dates for ad campaigns for Chipitos on ABC Co.:

1. Football Championship: The Football Championship is one of the most-watched television events in the United States and is a significant occasion for snack foods. Chipitos could consider running an ad campaign on ABC Co. in the weeks leading up to the Super Bowl and ending shortly after the game.
2. Summer months: The summer months are a popular time for outdoor activities such as picnics, barbecues, and other gatherings where snacks are often served. Chipitos may want to consider running an ad campaign on Instacart starting in late May or early June and ending in August.
3. Back to school: The back-to-school season is a significant time for snacks, as students often need quick and convenient options to pack in their lunches. Chipitos could consider running an ad campaign on Instacart starting in late July or early August and ending in September."

Another example input prompt to the LLM of the model serving system 150 may be:

"Could you propose the user groups for ad campaigns for Chipitos on Instacart? User groups could be states or cities."

A response from the LLM to the above input prompt may be:

"As an AI language model, I don't have access to specific data on Chipitos' target audience or sales trends in different locations. However, I can provide some general recommendations for user groups that Chipitos could consider targeting in their Instacart ad campaigns.

1. Urban areas: Urban areas, such as major cities, are often densely populated and have a high demand for convenience and snack foods. Chipitos may want to target urban areas where their products are popular and well-known.
2. College towns: College towns may be a good target audience for Chipitos, as college students often have a preference for quick and convenient snack options. Colleges and universities are also often located in smaller cities or towns, making it easier to target a specific location.
3. Sports and entertainment venues: Sports stadiums, arenas, and other entertainment venues may be a good target audience for Chipitos, as they often have high attendance numbers and a significant demand for snack foods. Targeting these locations could help increase brand awareness and drive sales.
4. States with high snack consumption: Chipitos could also consider targeting states with a high consumption of snack foods. According to market research, some of the states with the highest snack consumption include Texas, California, and Florida."

The campaign setting module 229 may be configured to parse the response received from the LLM and extract information from the response to generate suggestions for attribute values for the ad campaign being created by the user or to autofill form fields based on the response. For example, in the first example above relating to the start and end date attributes of the Chipitos ad campaign, the campaign setting module 225 may extract date ranges based on the response from the LLM and present the extracted date ranges as suggestions for the user to choose from when creating the ad campaign. The campaign setting module 225 may also present the response from the LLM, e.g., as popup text, to show the reasons for the recommended start and end dates for the ad campaign.

Similarly, in the second example above relating to user groups, the campaign setting module 229 may identify specific geographic regions (e.g., based on external map data) for targeting the user groups (e.g., urban areas, college towns, sports and entertainment venues) identified in the response from the LLM, and autofill the relevant form fields in the user interface for creating the new ad campaign based on the identified geographic regions. The campaign setting module 229 may also present the response from the LLM, e.g., as popup text, to show the reasons for the selected attribute values of the auto filled form fields. The user can thus simply review the auto filled form fields (or select from a suggested list of recommendations) and quickly and easily launch an ad campaign for an identified product that has a high likelihood of producing desired results (e.g., threshold click through rate, threshold conversion rate, etc.).

In one or more embodiments, the responses from the LLM are further fine-tuned based on previous ad campaigns for the product or other similar products launched by the user or other users of the online concierge system 140. Specifically, in one or more embodiments, the campaign setting module 229 may provide the model interface system 160 with historical information of previous ad campaigns. The historical information can be used to provide external data or context to the LLM that provides insight into which suggestions or recommendations for attribute values lead for higher performance of the ad campaign (e.g., higher click through rate, higher conversion rate, higher number of impressions), and fine-tuning the ad campaign settings based on the insight.

In one or more embodiments, for a given ad campaign, the campaign setting module 229 may also provide the model serving system 150 and/or the interface system 160 with a collected history of previous ad campaigns of the individual user creating the campaign or the particular item which is being sponsored. This way, the LLM can generate fine-tuned suggestions for attribute values for the ad campaign and automate the ad campaign creation process.

Figure 6:
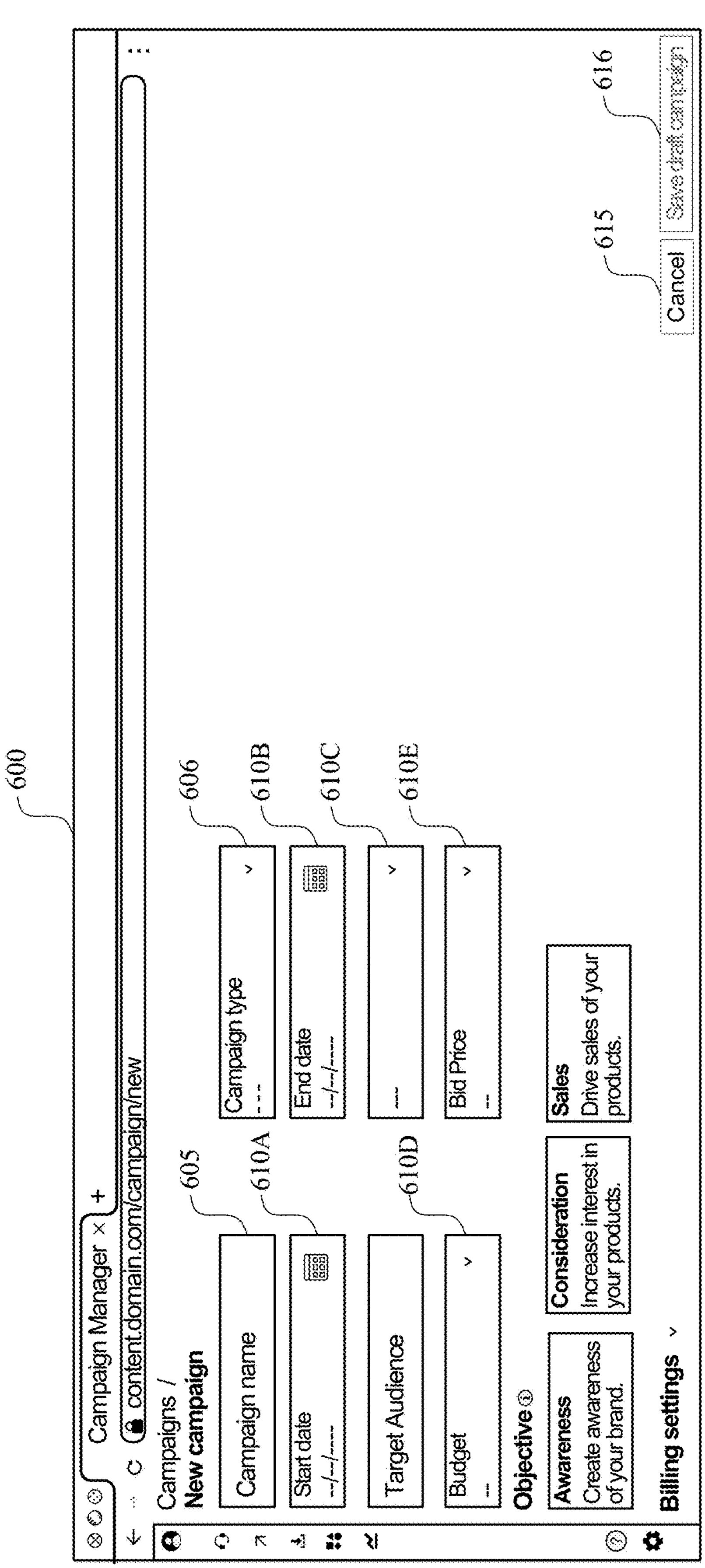
FIG. 6 shows an exemplary user interface of the online system to create a new ad campaign, in accordance with one or more embodiments.
Figure 7:
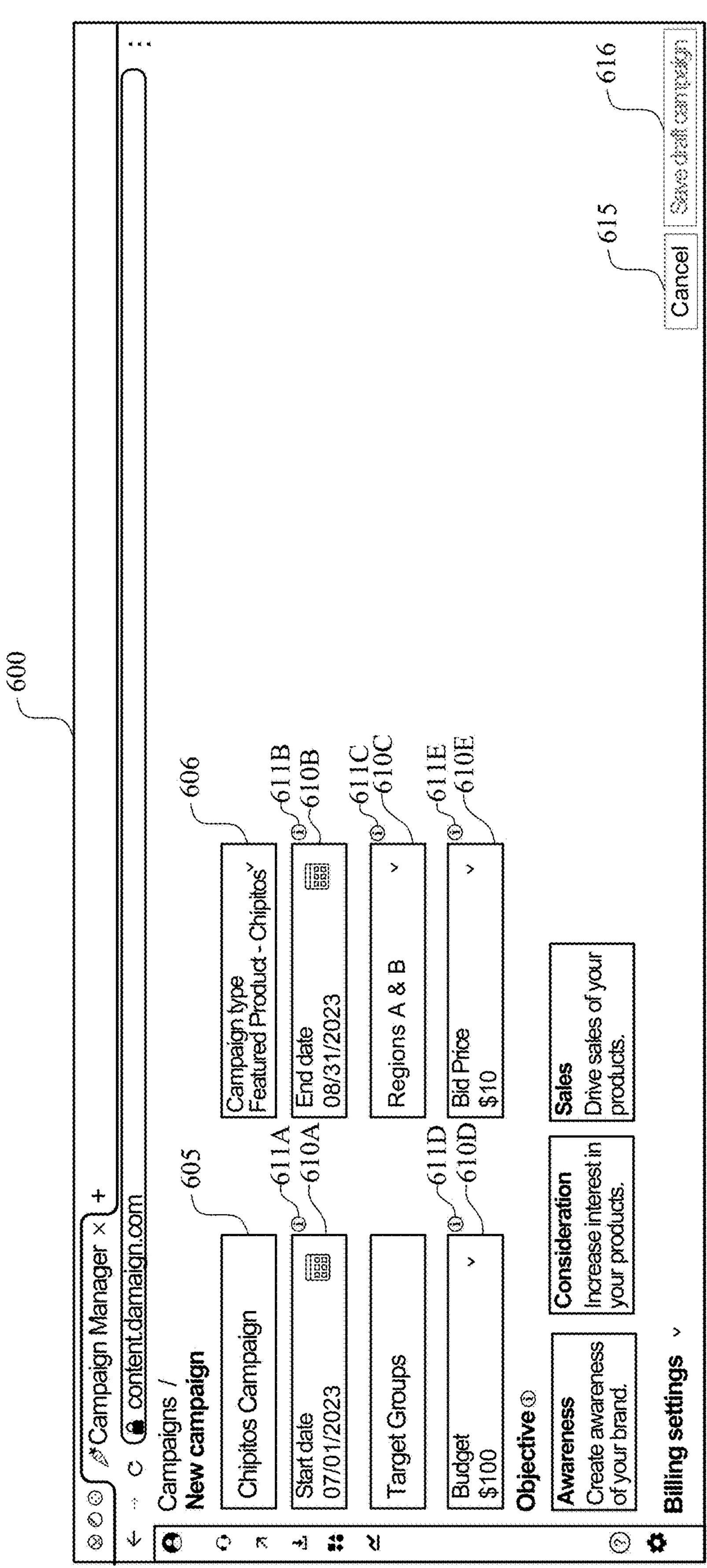
FIG. 7 shows the exemplary user interface in which form fields have been pre-populated, in accordance with one or more embodiments.

FIG. 6 shows an exemplary user interface 600 of the online system 140 to create a new ad campaign, in accordance with one or more embodiments. FIG. 7 shows the exemplary user interface 600 in which form fields 610 have been pre-populated (e.g., auto-populated, auto filled) by the campaign setting module 229 based on output recommendations from the machine-learned model, in accordance with one or more embodiments.

As shown in FIG. 6, a user may interact with the user interface 600 to create a new campaign. The user may assign a campaign name 305 to the campaign and select a campaign type 606. For example, as shown in FIG. 7, the user may create a new campaign for "Chipitos" and select the corresponding product from a list of available products. As shown in FIG. 7, based on the selected product, the campaign setting module 229 may automatically pre-populate form fields 610 (610A, 610B, 610C, 610D, 610E) based on the output of the machine-learned model. For example, as shown in FIG. 7, the campaign setting module 229 may automatically identify and fill the start and end dates 610A and 610B for the Chipitos campaign, automatically identify and fill in geographic Regions A and B as the Target Audience 610C for the Chipitos campaign, and automatically identify and fill form fields 610D and 610E respectively for the campaign budget and the bid price.

Further, as shown in FIG. 7, the campaign setting module 229 may interact with the user interface 600 to present more info icons 611 (611A, 611B, 611C, 611D, 611E) for presenting to the user (e.g., as mouse hover popup text) the reasoning behind suggesting particular attribute values for the auto-populated form fields 610 for the ad campaign. The user interface 600 may further include interface elements to save 616 or cancel 615 the changes made to the campaign settings for the new ad campaign. The auto-filled fields shown in FIGS. 6 and 7 are for illustration only and not intended to be limiting. In one or more embodiments, the campaign setting module 229 may automatically identify and pre-populate alternate or additional settings for the ad campaign.

Figure 8:
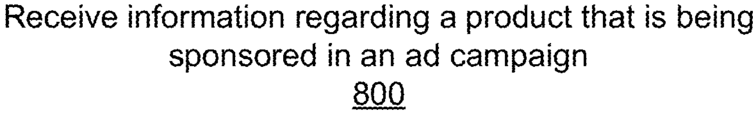
FIG. 8 is a flowchart for a method of suggesting attribute values for attributes of an ad campaign for a particular product, in accordance with one or more embodiments.

FIG. 8 is a flowchart for a method of suggesting attribute values for attributes of an ad campaign for a particular product, in accordance with some embodiments. Alternative embodiments may include more, fewer, or different steps from those illustrated in FIG. 8, and the steps may be performed in a different order from that illustrated in FIG. 8. These steps may be performed by an online concierge system (e.g., online concierge system 140). Additionally, each of these steps may be performed automatically by the online concierge system without human intervention.

The online system 140 receives 800, from one or more client devices, information regarding an item that is being sponsored in an ad campaign. For example, advertisers may interact with a user interface of the online system 140 to create a new ad campaign. The online system 140 generates 810 a prompt for input to a machine-learned language model. The prompt may specify at least the product and an attribute whose value is to be recommended by the model. In some embodiments, the prompt may also include historical information (e.g., metadata) about the item or other similar items or the user. For example, the information may include campaign performance, previous campaign attribute values or settings, bid prices, etc.

The online system 140 provides 820 the prompt to a model serving system 150 for execution by the machine-learned language model. The online system 140 receives 830, from the model serving system 150, a response generated by executing the machine-learned language model on the prompt. The online system 140 parses 840 the response from the model serving system to extract the suggested attribute value for the attribute of the specified item's ad campaign. The response from the model serving system may include settings for campaign start and end dates, bid price, budget, and the like. The response may also include reasons for the recommended settings. The online system 140 extracts the reason for the suggested attribute value for the attribute.

The online system 140 pre-populates 850 form fields of the user interface based on the suggested attribute values (e.g., FIGS. 6 and 7). The online system 140 may also present to the user the reasons for the pre-populated attribute values based on the response from the model serving system.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, comprising:

receiving a request to present one or more content items to a user for presentation;

retrieving at least a set of candidate content items for the user, wherein a candidate content item promotes a respective item;

obtaining one or more prediction scores for each candidate content item, wherein obtaining the one or more prediction scores for each candidate content item comprises:

providing prompts to a model serving system deploying a machine-learned model, the prompts comprising requests for the one or more prediction scores based on a natural language description of each candidate content item and the user, wherein the machine-learned model is configured as a transformer architecture including one or more attention layers, the transformer architecture coupled to receive a set of input tokens encoding the natural language description and generate a set of output tokens, wherein the prompts request generation of a purchase score indicating a likelihood the user purchases the item, a relevance score indicating how relevant the item is to the user, and a click-through score indicating a likelihood the user will interact with the same candidate content item, and receiving the prediction scores from the model serving system, wherein the prediction scores include three or more prediction scores including the purchase score, the relevance score, and the click- through score;

extracting a set of features related to the user and the set of candidate content items;

applying a machine learned interaction model to the extracted set of features and the three or more prediction scores as input to the interaction model to generate interaction scores indicating likelihoods of interaction between the user and the candidate content items, wherein the three or more prediction scores are weighted differently from one another when the machine-learned interaction model is applied;

ranking the candidate content items according to the interaction scores, wherein the machine-learned interaction model is trained by:

obtaining at least a training instance including features related to content displayed to another user, and a relevance score, a prediction score, and a click-through score for the content, and training parameters of the interaction model using the training instance;

selecting a content item based on the interaction scores; and sending the selected content item to a user device for display to the user.

2. The method of claim 1, wherein retrieving at least the set of candidate content items for the user comprises:

obtaining item data describing a set of candidate items and user data describing the user, providing prompts to the model serving system or another model serving system, the prompts comprising requests for one or more customized copies for each candidate item, receiving the one or more customized copies, and generating the set of candidate content items by incorporating each customized copy for a respective candidate item into content for the candidate item.

3. The method of claim 1, further comprising:

obtaining one or more training instances, a training instance corresponding to a content item another user interacted with or converted on, the training instance including a prompt and a known prediction score for the content item;

applying parameters of the machine-learned model to the prompt for the training instance to generate an estimated output; and updating the parameters of the machine-learned model based on terms obtained from a loss function indicating a difference between the estimated output and the known prediction score.

4. The method of claim 1, further comprising:

receiving information regarding an item that is promoted in a content item campaign;

generating a prompt for input to the model serving system or another model serving system, the prompt specifying at least the item, an attribute, and historical information of the item;

parsing a response from the model serving system to extract a suggested attribute value for the attribute of the specified item;

populating form fields of a user interface (UI) based on the suggested attribute value; and deploying the campaign to present one or more content items related to the campaign to users using the suggested attribute value.

5. The method of claim 1, wherein the candidate content item is at least one or a combination of an advertisement, a recommendation to purchase an item of a retailer, or a banner.

6. A non-transitory computer-readable storage medium comprising stored instructions executable by a processor, the instructions when executed causing the processor to:

receive a request to present one or more content items to a user for presentation;

retrieve at least a set of candidate content items for the user, wherein a candidate content item promotes a respective item;

obtain one or more prediction scores for each candidate content item, wherein obtaining the one or more prediction scores for each candidate content item comprises:

providing prompts to a model serving system deploying a machine-learned model, the prompts comprising requests for the one or more prediction scores based on a natural language description of each candidate content item and the user, wherein the machine-learned model is configured as a transformer architecture including one or more attention layers, the transformer architecture coupled to receive a set of input tokens encoding the natural language description and generate a set of output tokens, wherein the prompts request generation of a purchase score indicating a likelihood the user purchases the item, a relevance score indicating how relevant the item is to the user, and a click-through score indicating a likelihood the user will interact with the same candidate content item, and receiving the prediction scores from the model serving system, wherein the prediction scores include three or more prediction scores including the purchase score, the relevance score, and the click-through score;

extract a set of features related to the user and the set of candidate content items;

apply a machine learned interaction model to the extracted set of features and the three of more prediction scores as input to the interaction model to generate interaction scores indicating likelihoods of interaction between the user and the candidate content items, wherein the three or more prediction scores are weighted differently from one another when the machine-learned interaction model is applied;

rank the candidate content items according to the interaction scores, wherein the machine-learned interaction model is trained by:

obtaining at least a training instance including features related to content displayed to another user, and a relevance score, a prediction score, and a click-through score for the content, and training parameters of the interaction model using the training instance; and select a content item based on the interaction scores; and send the selected content item to a user device for display to the user.

7. The non-transitory computer-readable storage medium of claim 6, further comprising instructions when executed causing the processor to:

obtain item data describing a set of candidate items and user data describing the user, provide prompts to the model serving system or another model serving system, the prompts comprising requests for one or more customized copies for each candidate item, receive the one or more customized copies, and generate the set of candidate content items by incorporating each customized copy for a respective candidate item into content for the candidate item.

8. The non-transitory computer-readable storage medium of claim 6, further comprising instructions when executed causing the processor to:

obtain one or more training instances, a training instance corresponding to a content item another user interacted with or converted on, the training instance including a prompt and a known prediction score for the content item;

apply parameters of the machine-learned model to the prompt for the training instance to generate an estimated output; and update the parameters of the machine-learned model based on terms obtained from a loss function indicating a difference between the estimated output and the known prediction score.

9. The non-transitory computer-readable storage medium of claim 6, further comprising instructions when executed causing the processor to:

receive information regarding an item that is promoted in a content item campaign;

generate a prompt for input to the model serving system or another model serving system, the prompt specifying at least the item, an attribute, and historical information of the item;

parse a response from the model serving system to extract a suggested attribute value for the attribute of the specified item;

populate form fields of a user interface (UI) based on the suggested attribute value; and deploy the campaign to present one or more content items related to the campaign to users using the suggested attribute value.

10. The non-transitory computer-readable storage medium of claim 6, wherein the candidate content item is at least one or a combination of an advertisement, a recommendation to purchase an item of a retailer, or a banner.

11. A computer system comprising:

a processor; and a non-transitory computer-readable medium storing instructions that, when executed by the processor, cause the computer system to:

receive a request to present one or more content items to a user for presentation;

retrieve at least a set of candidate content items for the user, wherein a candidate content item promotes a respective item;

obtain one or more prediction scores for each candidate content item, wherein obtaining the one or more prediction scores for each candidate content item comprises:

providing prompts to a model serving system deploying a machine-learned model, the prompts comprising requests for the one or more prediction scores based on a natural language description of each candidate content item and the user, wherein the machine-learned model is configured as a transformer architecture including one or more attention layers, the transformer architecture coupled to receive a set of input tokens encoding the natural language description and generate a set of output tokens, wherein the prompts request generation of a purchase score indicating a likelihood the user purchases the item, a relevance score indicating how relevant the item is to the user, and a click-through score indicating a likelihood the user will interact with the same candidate content item, and receiving the prediction scores from the model serving system, wherein the prediction scores include three or more prediction scores including the purchase score, the relevance score, and the click-through score;

extract a set of features related to the user and the set of candidate content items;

apply a machine learned interaction model to the extracted set of features and the three or more prediction scores as input to the interaction model to generate interaction scores indicating likelihoods of interaction between the user and the candidate content items, wherein the three or more prediction scores are weighted differently from one another when the machine-learned model is applied;

rank the candidate content items according to the interaction scores, wherein the machine-learned interaction model is trained by:

obtaining at least a training instance including features related to content displayed to another user, and a relevance score, a prediction score, and a click-through score for the content, and training parameters of the interaction model using the training instance;

select a content item based on the interaction scores; and send the selected content item to a user device for display to the user.

12. The computer system of claim 11, further comprising instructions when executed causing the computer system to:

obtain item data describing a set of candidate items and user data describing the user;

provide prompts to the model serving system or another model serving system, the prompts comprising requests for one or more customized copies for each candidate item;

receive the one or more customized copies; and generate the set of candidate content items by incorporating each customized copy for a respective candidate item into content for the candidate item.

* * * * *